United States Patent
Kong et al.

(10) Patent No.: US 7,551,792 B2
(45) Date of Patent: Jun. 23, 2009

(54) SYSTEM AND METHOD FOR REDUCING RINGING ARTIFACTS IN IMAGES

(75) Inventors: Hao-Song Kong, Newton, MA (US);
Anthony Vetro, Cambridge, MA (US);
Yao Nie, Newark, DE (US); Kenneth Eugen Barner, Newark, DE (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 543 days.

(21) Appl. No.: 10/832,614

(22) Filed: Apr. 27, 2004

(65) Prior Publication Data
US 2005/0100241 A1   May 12, 2005

Related U.S. Application Data

(63) Continuation-in-part of application No. 10/703,809, filed on Nov. 7, 2003.

(51) Int. Cl.
*G06K 9/40* (2006.01)
*G06K 9/56* (2006.01)
*G06K 9/36* (2006.01)

(52) U.S. Cl. .................. 382/260; 382/268; 382/275; 382/205; 382/233

(58) Field of Classification Search ............. 382/260, 382/261, 233, 266, 268, 275, 205, 279
See application file for complete search history.

(56) References Cited

U.S. PATENT DOCUMENTS

| 5,757,977 | A | * | 5/1998 | Mancuso et al. | 382/260 |
| 5,920,356 | A | | 7/1999 | Gupta et al. | 348/606 |
| 6,101,276 | A | * | 8/2000 | Adiletta et al. | 382/236 |
| 6,167,157 | A | | 12/2000 | Sugahara | 382/236 |
| 6,178,205 | B1 | | 1/2001 | Cheung et al. | 375/240.29 |
| 6,259,823 | B1 | * | 7/2001 | Lee et al. | 382/268 |
| 6,320,905 | B1 | | 11/2001 | Konstantinides | 375/240.08 |
| 6,332,136 | B1 | | 12/2001 | Di Giura et al. | 706/1 |
| 6,496,605 | B1 | | 12/2002 | Osa | 382/268 |
| 6,539,060 | B1 | | 3/2003 | Lee et al. | 375/240.29 |
| 2003/0081854 | A1 | * | 5/2003 | Deshpande | 382/261 |

FOREIGN PATENT DOCUMENTS

JP    2005166021 A  *  6/2005

OTHER PUBLICATIONS

Wei, A.—"Fuzzy ordering theory and its use in the filter generalization"—EURASIP Journal on Applied Signal Processing 2001, pp. 206-218.*
Lu, L. —"Full-Reference video quality assessment considering structural distortion and no-reference quality evaluation of MPEG video"—IEEE, 2002, pp. 61-64.*

(Continued)

*Primary Examiner*—Jingge Wu
*Assistant Examiner*—Bernard Krasnic
(74) *Attorney, Agent, or Firm*—Dirk Brinkman; Gene Vinokur (57) ABSTRACT

A method reduces artifacts in an input image. A variance image is generated from the input image. The input image is partitioned into a plurality of blocks of pixels. A set of classifications is defined. The set of classifications includes smooth, texture, and edge. A particular classification is assigned to each block of pixels of the input image according to the variance image, to generate smooth blocks, texture blocks, and edge blocks. A fuzzy filter is applied to each pixel of only each edge block.

9 Claims, 8 Drawing Sheets

OTHER PUBLICATIONS

Baturone, I.—Microelectronic design of fuzzy logic based system, CRC Press, United States, 2000, p. 9.*

Barner, K.—"Optimized Fuzzy Transformation For Image Deblocking"—IEEE—Jul. 2003, pp. 541-544.*

Huang, Y.—"Adaptive MLP Post-Processing For Block-based Coded Images"—IEE Proc. Vis. Image Signal Process, vol. 147, No. 5, Oct. 2000, pp. 463-473.*

Lang, et al., "*Noise reduction using an undecimated discrete wavelet transform*," Signal Processing Newsletters, vol. 13, Jan. 1996.

Triantafyllidis, et al., "*Blocking artifact detection and reduction in compressed data*," IEEE Transactions on Circuits and Systems for Video Technology, vol. 12, Oct. 2002.

Chen, et al., "*Adaptive post-filtering of transform coefficients for the reduction of blocking artifacts*," IEEE Transactions on Circuits and Systems for Video Technology, vol. 11, May 2001.

Xiong, et al., "*A deblocking algorithm for JPEG compressed images using overcomplete wavelet representations,*" IEEE Transactions on Circuits and Systems for Video Technology, vol. 7, No. 2, Aug. 1997.

Paek, et al., "*A DCT-based spatially adaptive post-processing technique to reduce the blocking artifacts in transform coded images*," IEEE Transactions on Circuits and Systems for Video Technology, vol. 10, Feb. 2000.

Paek, et al., "*On the POCS-based post-processing technique to reduce the blocking artifacts in transform coded images*," IEEE Transactions on Circuits and Systems for Video Technology, vol. 8, Jun. 1998.

Arakawa, "*Fuzzy rule-based signal processing and its application to image restoration*," IEEE Journal on selected areas in communications, vol. 12, No. 9, Dec. 1994.

* cited by examiner

SYSTEM AND METHOD FOR REDUCING RINGING ARTIFACTS IN IMAGES

RELATED APPLICATION

This application is a Continuation-in-Part application of U.S. patent application Ser. No. 10/703,809, "System and Method for Classifying and Filtering Pixels Field of the Invention," filed by Kong et al., on Nov. 7th, 2003.

FIELD OF THE INVENTION

The invention relates generally to digital signal processing, and more particularly to reducing image and video coding artifacts.

BACKGROUND OF THE INVENTION

Many imaging and video applications, such as digital cameras, HDTV broadcast and DVD, use compression techniques. Most image/video coding standards such as JPEG, ITU-T H.26×and MPEG-1/2/4 use block-based processing for the compression. Visual artifacts, such as blocking noise and ringing noise, occur in decompressed images due to the underlying block-based coding, coarse quantization, and coefficient truncation.

Many post-processing techniques are known for removing the coding artifacts.

Spatial domain methods are described in U.S. Pat. No. 6,539,060, "Image data post-processing method for reducing quantization effect, apparatus therefor," issued to Lee et al. on Mar. 25, 2003, U.S. Pat. No. 6,496,605, "Block deformation removing filter, image processing apparatus using the same, method of filtering image signal, and storage medium for storing software therefor," issued to Osa on Dec. 17, 2002, U.S. Pat. No. 6,320,905, "Postprocessing system for removing blocking artifacts in block-based codecs," issued to Konstantinides on Nov. 20, 2001, U.S. Pat. No. 6,178,205, "Video postfiltering with motion-compensated temporal filtering and/or spatial-adaptive filtering," issued to Cheung et al. on Jan. 23, 2001, U.S. Pat. No. 6,167,157, "Method of reducing quantization noise generated during a decoding process of image data and device for decoding image data," issued to Sugahara et al. on Dec. 26, and 2000, U.S. Pat. No. 5,920,356, "Coding parameter adaptive transform artifact reduction process," issued to Gupta et al. on Jul. 6, 1999.

Discrete cosine transform (DCT) domain methods are described by Triantafyllidis, et al., "*Blocking artifact detection and reduction in compressed data*," IEEE Transactions on Circuits and Systems for Video Technology, Vol. 12, October 2002, and Chen, et al., "*Adaptive post-filtering of transform coefficients for the reduction of blocking artifacts*," IEEE Transactions on Circuits and Systems for Video Technology, Vol. 11, May 2001.

Wavelet-based filtering methods are described by Xiong, et al., "*A deblocking algorithm for JPEG compressed images using overcomplete wavelet representations*," IEEE Transactions on Circuits and Systems for Video Technology, Vol. 7, No. 2, August 1997, and Lang, et al., "*Noise reduction using an undecimated discrete wavelet transform*," Signal Processing Newsletters, Vol. 13, January 1996.

Figure 1:
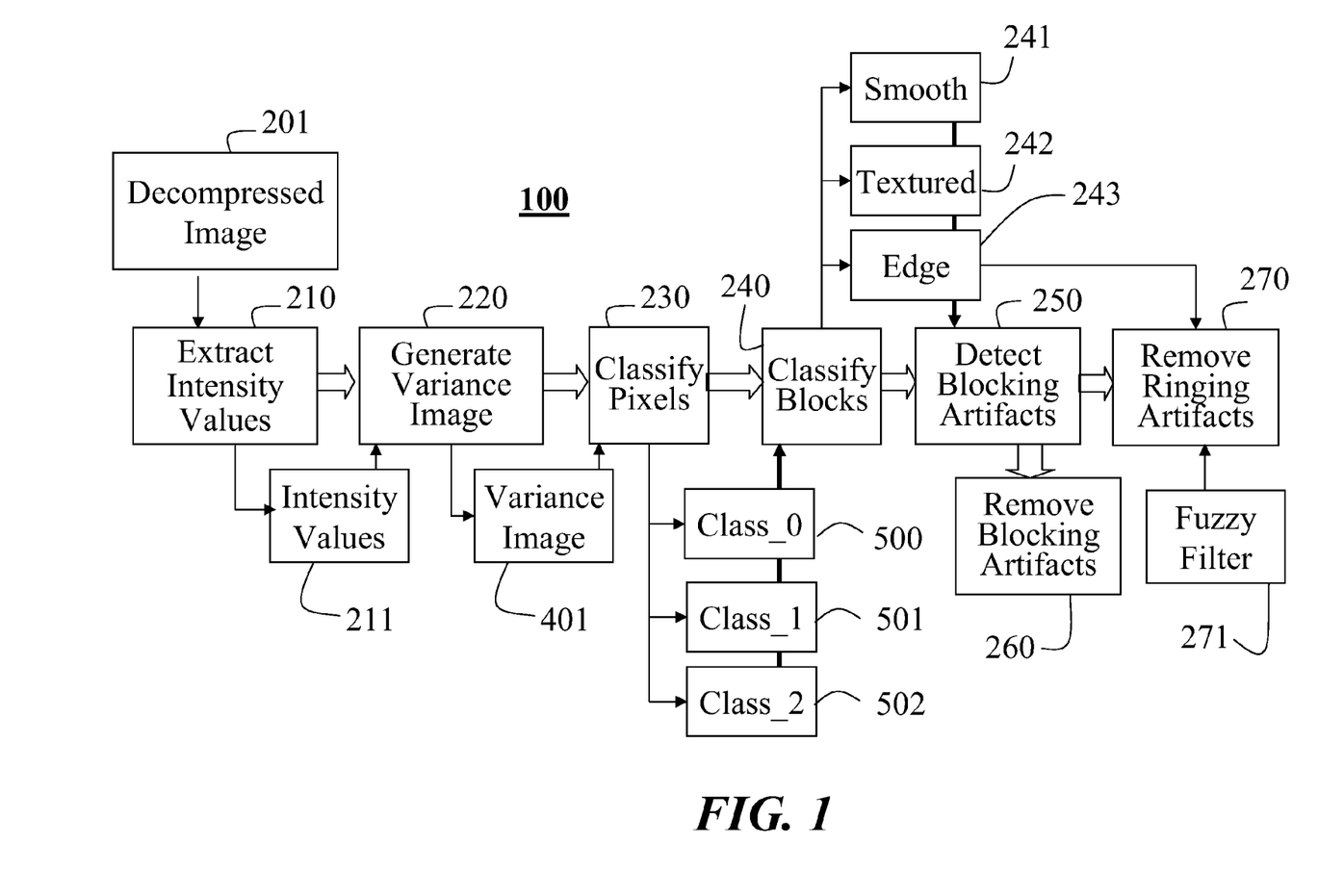
FIG. 1 is a block diagram of a method and system for removing artifacts from a decompressed image according to the invention.

Iterative methods are described by Paek, et al., "*A DCT-based spatially adaptive post-processing technique to reduce the blocking artifacts in transform coded images*," IEEE Transactions on Circuits and Systems for Video Technology, Vol. 10, February 2000, and Paek, et al., "*On the POCS-based post-processing technique to reduce the blocking artifacts in transform coded images*," IEEE Transactions on Circuits and Systems for Video Technology, Vol. 8, June 1998. The typical conventional post-filtering architecture is shown in FIG. 1.

Fuzzy rule-based filtering methods are described by Arakawa, "*Fuzzy rule-based signal processing and its application to image restoration*," IEEE Journal on selected areas in communications, Vol. 12, No. 9, December 1994, and U.S. Pat. No. 6,332,136, "Fuzzy filtering method and associated fuzzy filter," issued to Giura et al. on Dec. 18, 2001.

Most of the prior art methods deal only with removing blocking noise. Those methods are not effective for ringing noise. Some methods, such as the wavelet-based methods, can suppress ringing, but cause blurring in the entire decompressed image. The prior art of fuzzy rule-based filtering method deals only with white Gaussian noise.

The above prior art methods operate individually on pixels, and apply the same filter to each pixel. Those methods do not consider the underlying content of the image, as a whole. Therefore, those filters either smooth the image excessively to eliminate the artifacts, which causes blurring, or cannot reduce the artifacts sufficiently when minimal smoothing is applied.

Another major problem of those methods is the computational complexity. For example, the wavelet-based method requires eight convolution-based low-pass and high-pass filtering operations to obtain the wavelet images. Then, the de-blocking operation is performed on these wavelet images to remove the blocking artifacts. To reconstruct the de-blocked image, twelve convolution-based low-pass and high-pass filtering operations are required. Thus, a total of twenty convolution-based filtering operations are required in that method. The computational cost cannot meet the requirements of real-time processing. Similar to the wavelet-based method, DCT-domain method also has high computational complexity. For low-pass filtering using a 5×5 window, twenty-five DCT operations are required for processing a single 8×8 block. Such high complexity is also impractical for real-time processing. The computational cost for the iterative method is even higher than that of the above two methods. As for the fuzzy rule-based filtering method, the iterative method requires a large number of filter parameters, and extra training data.

In view of the problems of the above-mentioned prior art methods, it is desired to provide a new filtering mechanism that achieves better image and video quality with a low computational complexity.

SUMMARY OF THE INVENTION

A method reduces artifacts in an input image. A variance image is generated from the input image. The input image is partitioned into a plurality of blocks of pixels.

A set of classifications is defined. The set of classifications includes smooth, texture, and edge. A particular classification is assigned to each block of pixels of the input image according to the variance image, to generate smooth blocks, texture blocks, and edge blocks.

A fuzzy filter is applied to each pixel of each edge block.

DETAILED DESCRIPTION OF THE PREFERRED EMBODIMENT

FIG. 1 shows the system and method 100 according to the invention. This system is independent of any image or video decoder. The system does not rely on any coding parameters embedded in a compressed image or video. The emphasis of our method is on local features in an image. The method according to the invention extracts local features, which are then classified. The classified features can then be used to filter selectively and adaptively the pixels, if the images is a decompressed image or video.

The input is a decompressed image 201. The method works for any image format, e.g., YUV or RGB. It should be understood that the system can handle a sequence of images as in a video. For example, the image 201 can be part of a progressive or interlaced video. It should also be noted that input image can be source image that has never been compressed.

However, if the input image is a decompressed image derived from a compresses image, and the compressed image was derived from a source image compressed with a block-based compression process, then due to prior compression, the decompressed image 201 has blocking artifacts caused by independent quantization of DCT coefficients blocks of the compressed image. Therefore, the decompressed image 201 has block discontinuities in spatial values between adjacent blocks. Ringing artifacts are also possible along edges in the decompressed image.

In order to reduce these artifacts, while preserving the original texture and edge information, the filtering according to the invention is based on a classification of local features in the decompressed image.

Variance Image

From a statistical perspective, a distribution of intensity values of the pixels reveals features of the decompressed image. A mean intensity value m of the image represents the DC component of the image. The mean intensity value can be measured by $$m = E\{x[i, j]\} = \sum_{i=0}^{M} \sum_{j=0}^{N} x_{i,j} p_{x_{i,j}}, \quad (1)$$

where M and N are width and height of the decompressed image in terms of pixels, and $p_{x_{i,j}}$ is a probability of a pixel occurred at a location of i, j in the image.

An average power of the decompressed image is a mean-square value $$\overline{m^2} = E\{x[i, j]^2\} = \sum_{i=0}^{M} \sum_{j=0}^{N} x_{i,j}^2 p_{x_{i,j}}. \quad (2)$$

A fluctuations about the mean is the variance $$\sigma^2 = E\{(x[i, j] - m)^2\} \quad (3)$$
$$= \sum_{i=0}^{M} \sum_{j=0}^{N} (x_{i,j} - m)^2 p_{x_{i,j}}$$
$$= \sum_{i=0}^{M} \sum_{j=0}^{N} x_{i,j}^2 p_{x_{i,j}} - m^2.$$

The mean-square represents an average power of DC component in the image, and the variance represents an average power of the AC frequency components in the decompressed image 201. Therefore, the variance of the intensity values are used as a measure of a fluctuation AC power, which represents the energy in the image.

If the variance is high for a pixel, then the pixel is likely to be associated with an edge. If the variance is low, then the pixel is part of a homogeneous region of the image, for example, a smooth background. Thus, the variance reveals characteristics of local features in the image.

Because both the blocking artifacts and the ringing artifacts are due to the local characteristics of features, i.e., the artifacts appear either on block boundaries or near the edges, the local features are sufficient to reveal these artifacts. Therefore, the classification and filtering according to the invention are based on the energy distribution as measured by the local variance of pixel intensity values, as stated in Equation (3) above. The feature characteristics are determined by extracting 210 intensity values 211 as follows.

Figure 3:
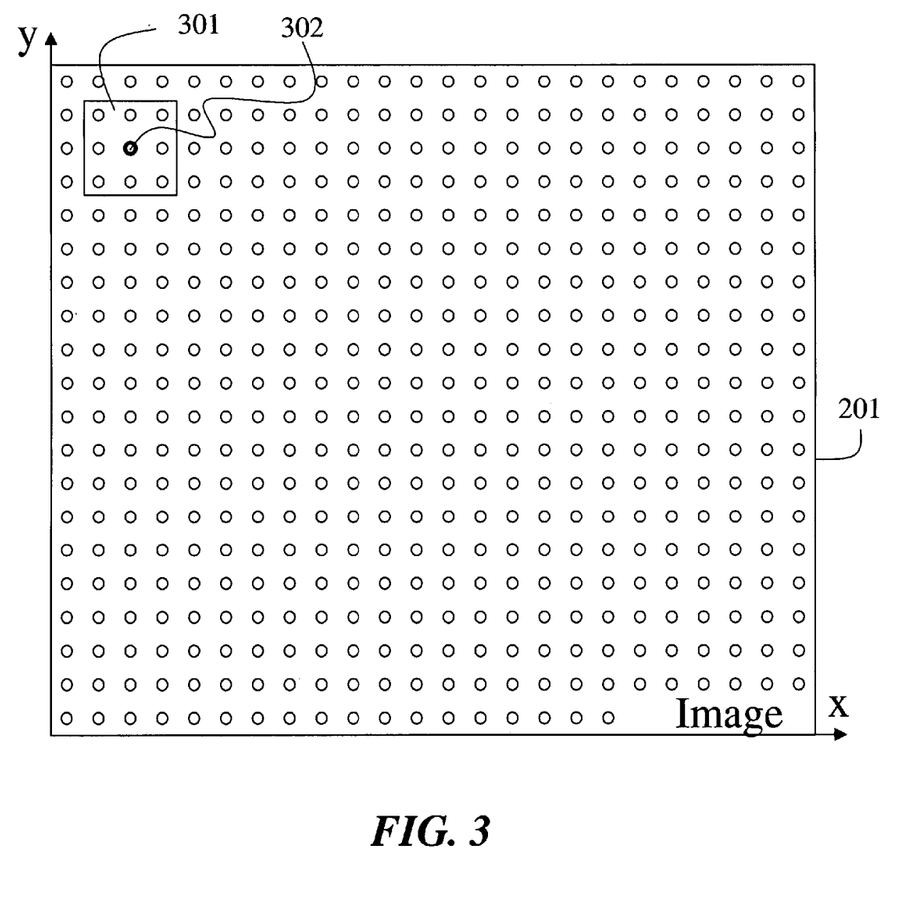
FIG. 3 is a block diagram of feature extraction according to the invention.

As shown in FIG. 3, a 3×3 filter 301 is scanned over each pixel 302 in a decompressed image 201. The scanning can be in raster scan order. The mean and the variance of the intensities values 211 are determined 220 for each central pixel 301 of the filter according to equations 1-3. The variance values form a variance image 401. From geometry viewpoint, the local variance reflects a gradient of the decompressed image at each pixel location. Because the gradient is very high at edges in the image, the variance image 401 can be considered an 'edge map'.

Figure 4:
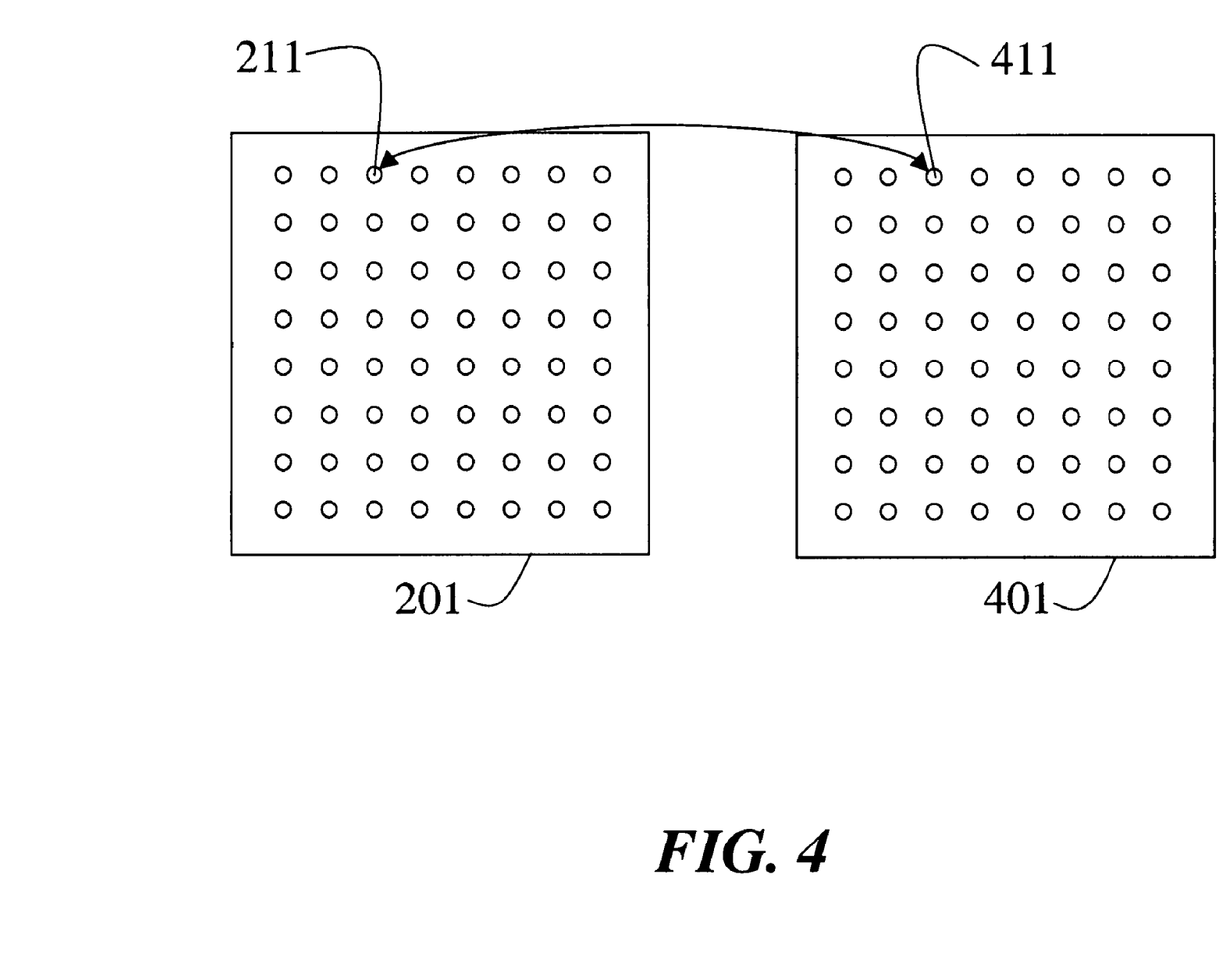
FIG. 4 is a block diagram of mapping between an intensity image and a variance according to the invention.

As shown in FIG. 4, the feature extraction and scanning transforms the decompressed image 201 from the spatial domain where the pixels have intensity values 211 to the variance image 401 in the energy domain where the pixels having variances 411.

Pixel Classification

Figure 5:
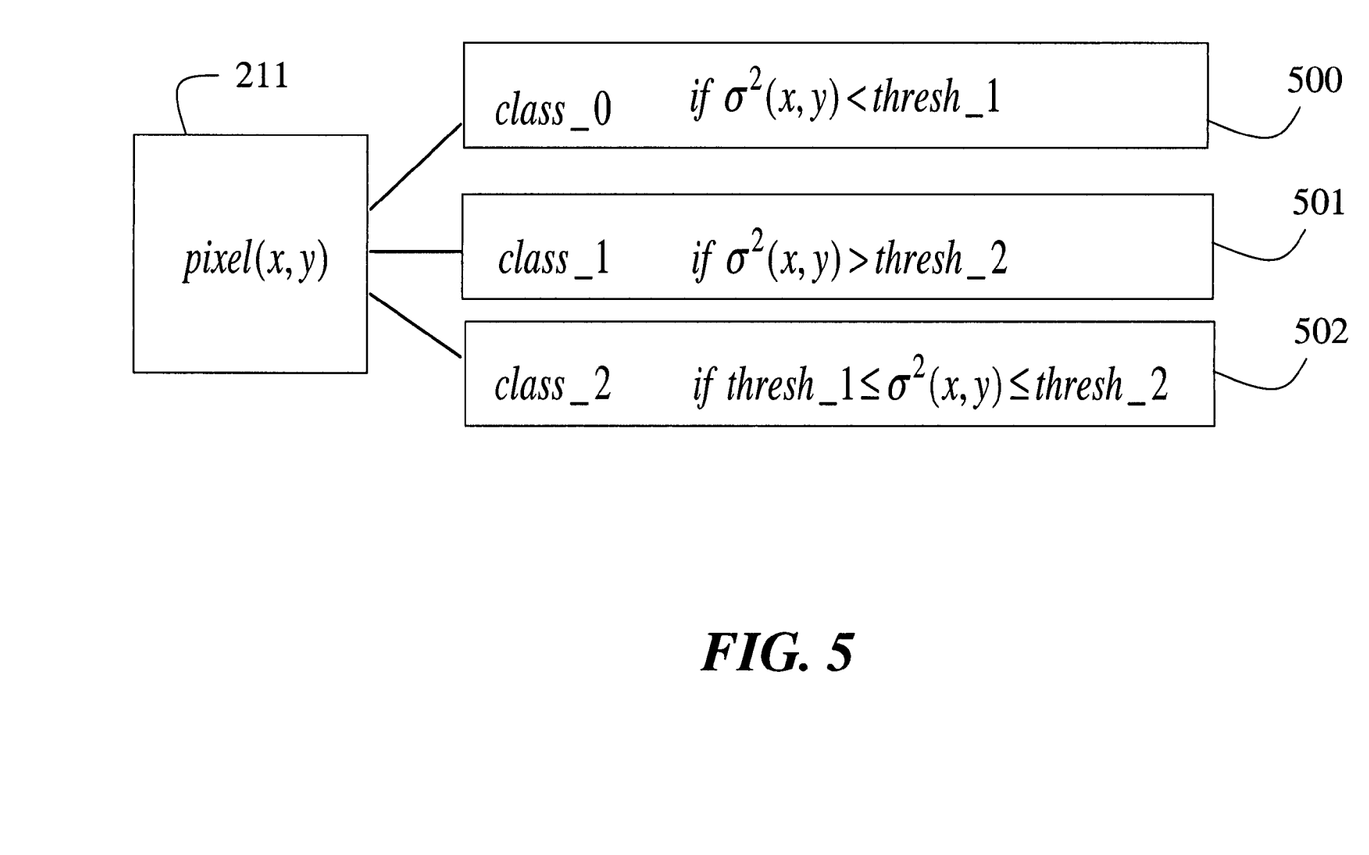
FIG. 5 is a block diagram for classifying pixels according to the invention.

As shown in FIG. 1 and in FIG. 5, pixels 211 with variances less than a first threshold_1 are classified 230 as class_0 500. These pixels correspond to homogeneous or 'smooth' regions in the image. Pixels with variances greater than a second threshold_2 are classified 230 as class_1 501. These pixels most likely correspond to edges. Pixels with variances between these two thresholds are classified 230 as class_2 502. These pixels can be considered as either ringing noise or texture depending on the characteristics of neighboring pixels. The adaptive filtering according to the invention is performed according to the above classifications.

Block Classification

Blocks of pixels are also classified 240 in into 'smooth' 241, 'textured' 242 and 'edge' 243 blocks according to the variance values in the variance image or 'edge map' 401. The block classification 240 can be based on the total variance within each block or by counting the number of pixels of each class in the block. For example, if all the pixels in the block are class_0, then the block is classified as smooth. If at least one pixel in the block is class_1, then the block is classified as an edge block. Otherwise, if the block has both class_0 and class_2 pixels, then the block is classified as a texture block.

Blocking Artifact Detection

Most recognized standards for compressing images and videos use are based on DCT coding of blocks of pixels. Block-base coding fully partitions the image into blocks of pixels, typically 8×8, or 16×16 pixels per block. The pixels of each block are transformed independently to DCT coefficients. Then, the DCT coefficients are quantized according to a predetermined quantization matrix. Due to the independent coding, the blocking artifacts are visible at the block boundaries.

Figure 6:
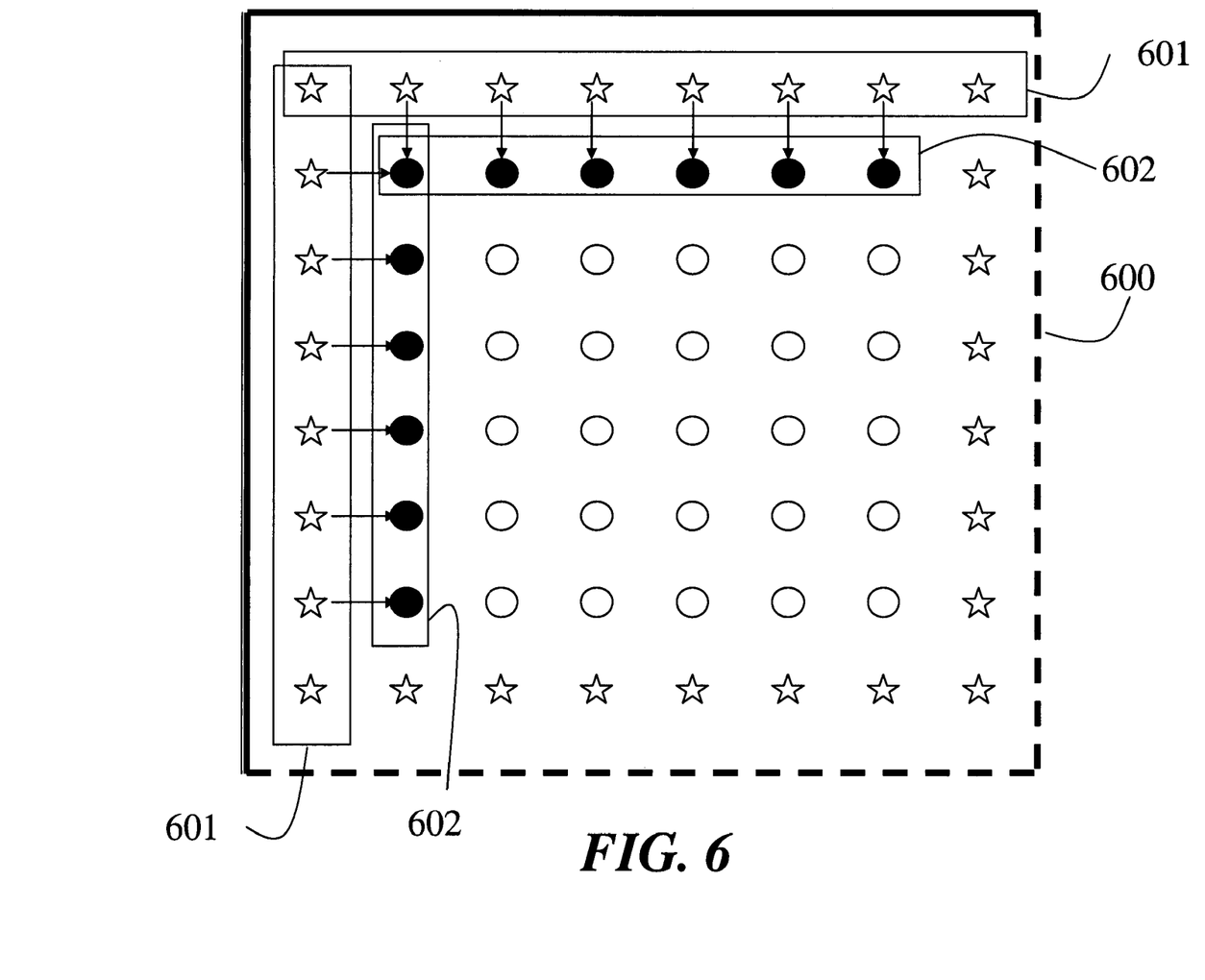
FIG. 6 is a block diagram for detecting blocking artifacts according to the invention.

FIG. 6 shows how blocking artifacts are detected 250 on an 8×8 block 600. Outer pixels are denoted by stars 601, and 'inner' pixels by black circles 602. The inner pixels are located adjacent and parallel to the top row and left column in the block. The detection 250 is performed from left to right and top to bottom for each block.

The gradients of the variances of the outer pixels 601 are most like the inner pixels 602 when blocking artifacts exist. The criterion for deciding that blocking artifact are present is $$\left| \sum_{i=1}^{6} \text{sign}(*_i - \bullet_i) \right| \geq 5 \quad (4)$$

sign is either +1 or −1. The above test distinguishes between blocking artifacts and edges on block boundaries.

Deblocking Filter

Figure 7:
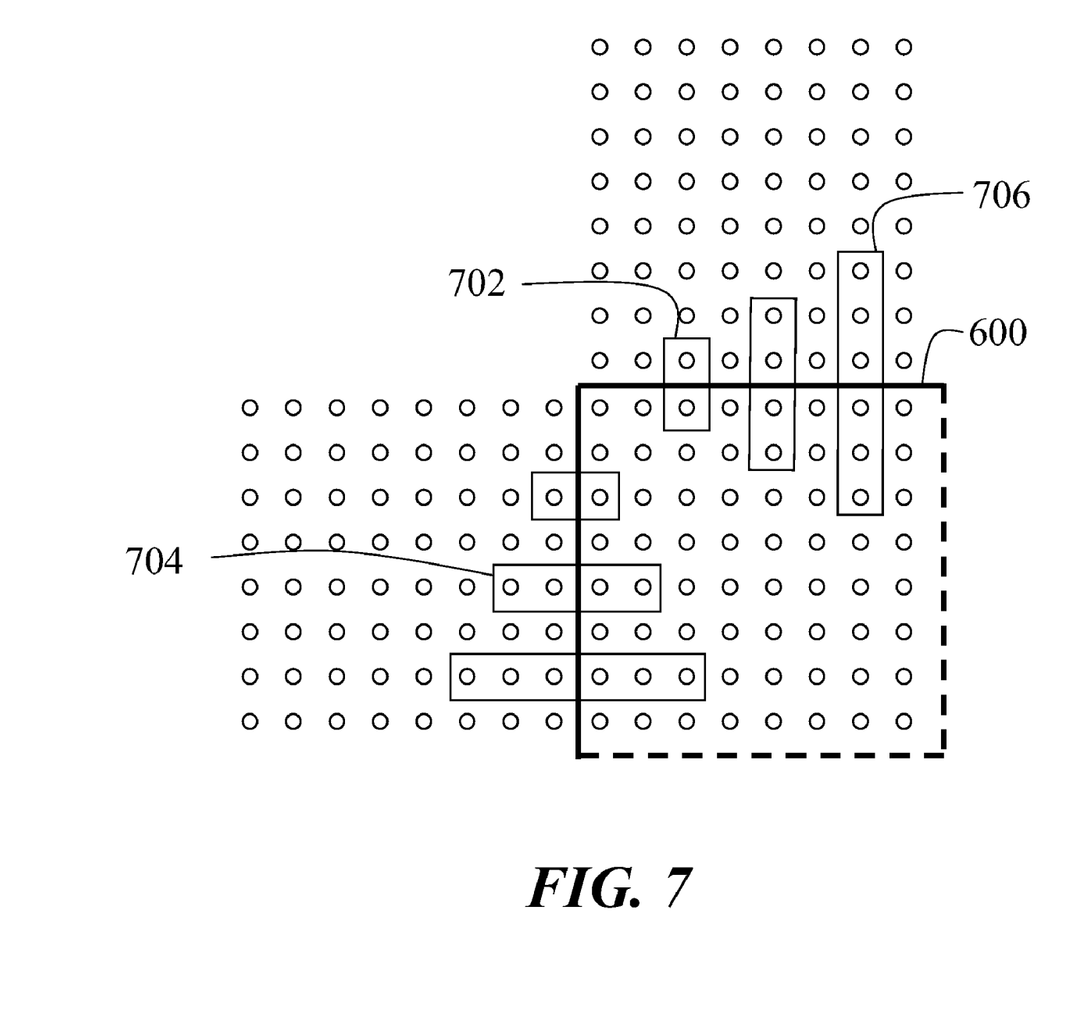
FIG. 7 is a block diagram for filtering blocking artifacts according to the invention.

As shown in FIG. 7, the blocking artifacts are removed 260 by filtering detected block boundaries in the decompressed image. If a blocking artifact is detected, a one-dimensional low-pass (smoothing) filter is adaptively applied to pixels along boundaries of the block 600. Sizes of the filters 702, 704, 706, e.g., two, four, six or more pixels, correspond to the gradients at the block boundaries. Pixels with large gradient values, i.e., edge pixels, are excluded from the filtering operation to avoid blurring edges or textures.

Fuzzy Filter

The deringing 270 operates only on edge blocks 243 by applying a fuzzy filter 271. The fuzzy filter according to the invention is based on the fuzzy transformation theory, see Nie et al., "*Fuzzy transformation and its applications*," IEEE International Conference on Image Processing, Barcelona, Spain, September, 2003.

In a fuzzy transformation, a relationship between spatial sample $x_i$, or pixel in case of an image, and an order (pixel) $x_j$, that is, the $j^{th}$ smallest sample in the sample set, is established by a real-valued membership function $\mu_F(a, b)$, where i is a spatial index i=1, 2, . . . , N, j=1, 2, . . . , N is an order statistic, $x_{(1)} \leq x_{(2)} \leq \ldots \leq x_{(N)}$, and N is a size of an observation or filtering window N×N. The symbols a and b represent general variables of the membership function, and can be any real numbers.

The membership functions $\mu_F(.,.)$ has the following constraints:

$$lim_{|a-b| \to 0} \mu_F(a,b)=1;$$

$$lim_{|a-b| \to \infty} \mu_F(a,b)=0; \text{ and}$$

$$|a_1-b_1| \leq |a_2-b_2| \Rightarrow \mu_F(a_1,b_1) \geq \mu_F(a_2,b_2).$$

This yields a N×N fuzzy spatial-rank (SR) matrix, which is defined by $$\tilde{R} = \begin{bmatrix} \tilde{R}_{1,(1)} & \cdots & \tilde{R}_{1,(N)} \\ \vdots & \ddots & \vdots \\ \tilde{R}_{N,(1)} & \cdots & \tilde{R}_{N,(N)} \end{bmatrix},$$

where $\tilde{R}_{i,(j)} = \mu_F(x_i, x_{(j)}) \in [0, 1]$, $i, j = 1, 2, \ldots N$.

Because elements of the fuzzy SR matrix R are dependent on a difference of values between each pair of samples (pixels), the fuzzy SR matrix contains spread information. The sample spread or diversity describes a similar of the samples. If the samples have similar value, then the samples have a small spread. Dissimilar samples have a large spread.

The original or 'crisp' pixels in the input image can be transformed into fuzzy pixel in the output image by multiplying a 'crisp' order statistics vector with a row normalized fuzzy SR matrix. The resulting fuzzy pixel also reflect the sample spread information. Therefore, the output of the fuzzy filter 271 according to the invention is the fuzzy counterpart of a center sample in a filtering window.

The filter output can be obtained using the following simplified formula $$y = \tilde{x}_c = \frac{\sum_{j=1}^{N} x_{(j)} \mu_F(x_c, x_{(j)})}{\sum_{j=1}^{N} \mu_F(x_c, x_{(j)})}$$

$$= \frac{\sum_{j=1}^{N} x_j \mu_F(x_c, x_j)}{\sum_{j=1}^{N} \mu_F(x_c, x_j)}$$

$$= \frac{x_c + \sum_{j=1, j \neq c}^{N} x_j \mu_F(x_c, x_j)}{1 + \sum_{j=1, j \neq c}^{N} \mu_F(x_c, x_j)},$$

where $x_c$ and $\tilde{x}_c$ are the input pixel, and the output pixel after application of the fuzzy filter to the center pixel, respectively.

As implied by the final expression of the filter output, a sample ordering operation is unnecessary. Thus, the computational complexity of the fuzzy filter 271 is only slightly higher than that of the linear filter. The only extra computation is for evaluating the membership function values between N−1 pairs of samples. Note that $\mu_F(x_c, x_c)=1$ for all samples or samples, and thus need not to be determined.

In a preferred embodiment of the invention, a particular real-valued membership function $\mu_G(a, b)$ is defined by a Gaussian function $e^{-(a-b)^2/2\zeta_2}$; where the spread parameter is $\zeta=20$.

Figure 2:
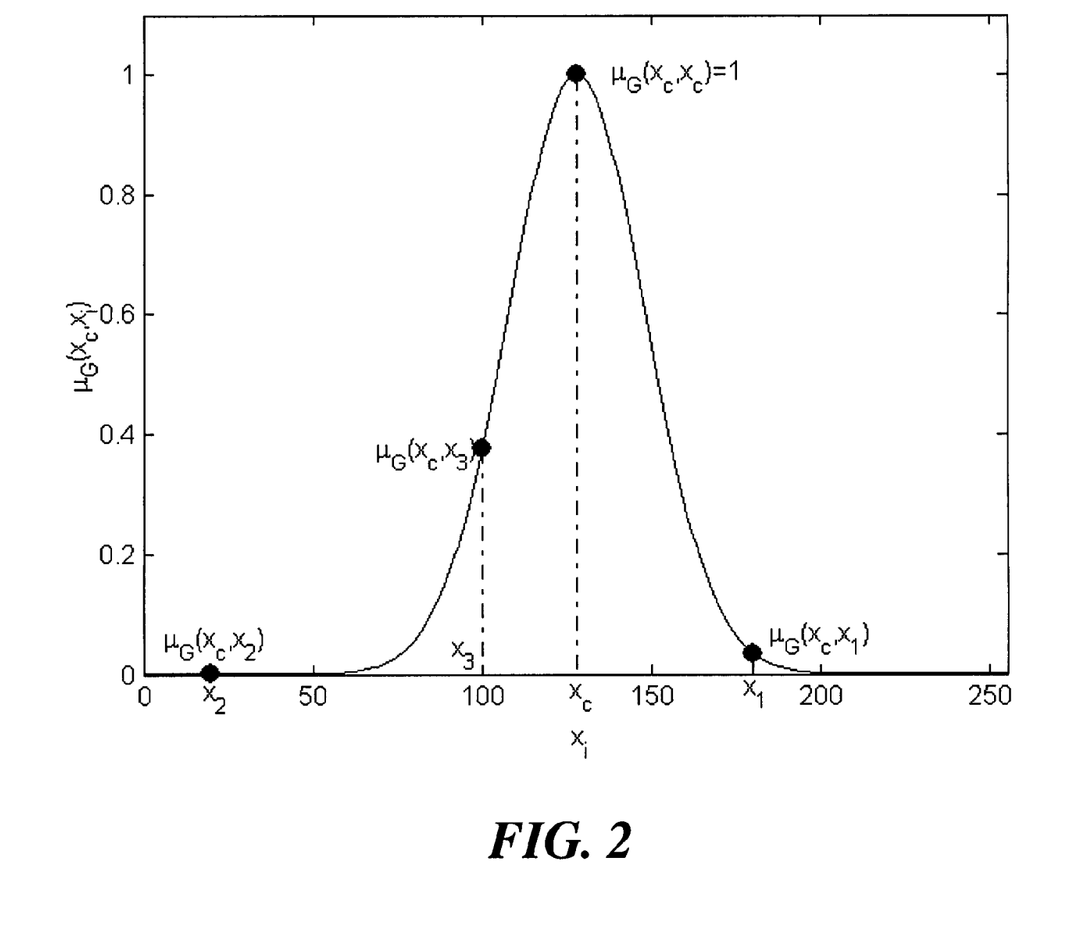
FIG. 2 is a graph of a Gaussian function for evaluating pixel value affinities and generating fuzzy filter parameters according to the invention.

FIG. 2 shows example values of the Gaussian membership function $\mu_G(a, b)$, which represents the value affinity between a sample $x_i$ for i=1, 2, . . . , N, and the center sample of the filtering window $x_c$. In the given example, $x_c=128$, $x_1=180$, $x_2=20$, and $x_3=100$.

From the above expression, we can see that the fuzzy filter output is a weighted average of the samples in the filtering window. The Gaussian membership function value, i.e., the similarity measure of each sample to the center sample, including the center sample itself, is used as the weight of the corresponding fuzzy sample.

Thus, the closer the sample value is to the center sample, the larger weight is assigned to the sample. This leads to the effect that the similarly valued samples are further clustered around their local mean, while disparately valued samples are substantially the same. This is known as the clustering property of the fuzzy transformation.

As the result, the fuzzy filter 271 according to the invention has a data-adaptive smoothing feature, and thus can perfectly preserve strong edges, while removing weak edges associated with annoying ringing artifacts.

Figure 8:
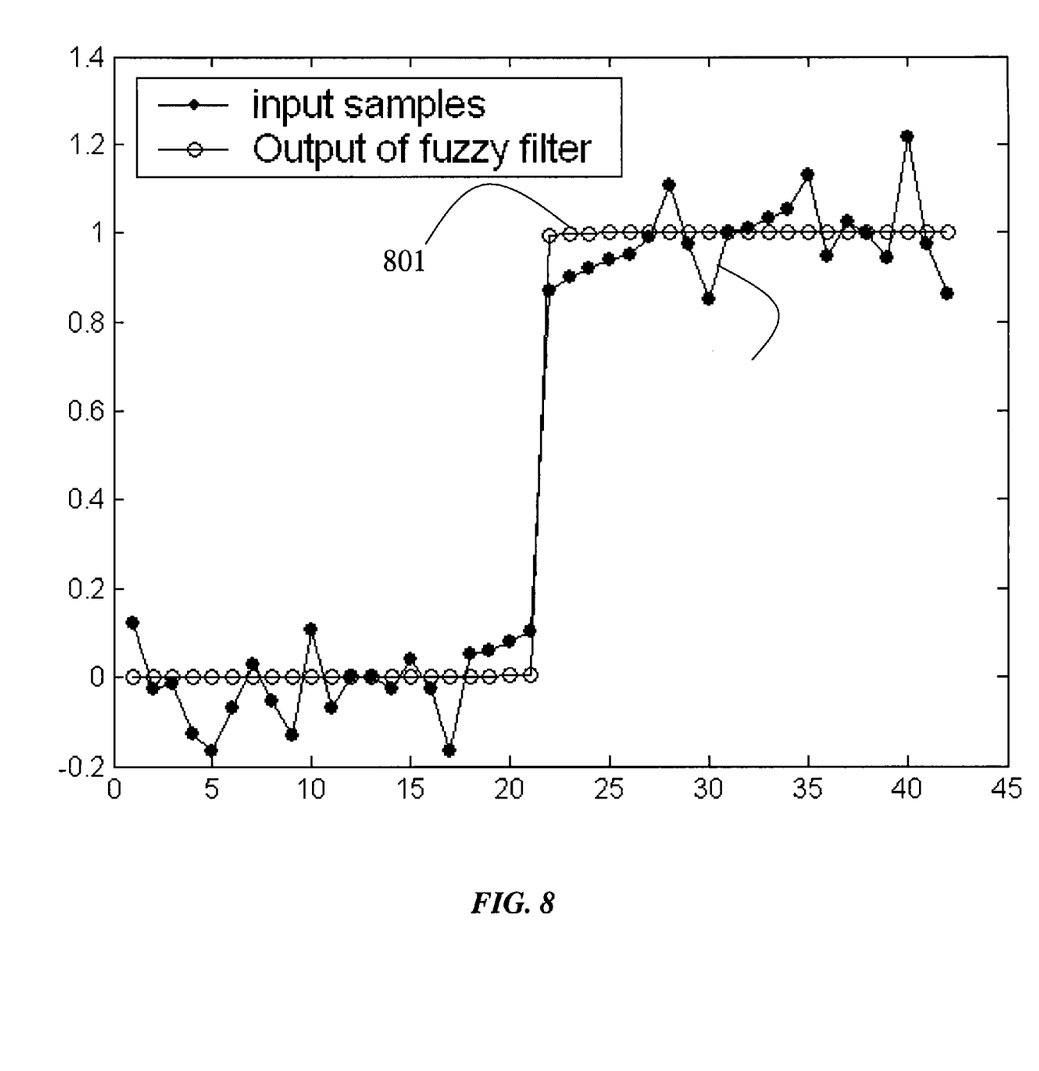
FIG. 8 is a graph showing data-adaptive smoothing property of a fuzzy filter according to the invention.

FIG. 8 shows this feature. In this example, input samples (pixels) of a 'step' signal 801 are corrupted by uniformly distributed noise. The corrupted signal is thus constituted by two groups of crisp samples, one group is localizes around zero, and the other group around one.

After filtering by the fuzzy filter 271, each group including similarly valued samples is more clustered tightly around a local mean of the group, resulting in a filtered step signal 801. Thus, the undesirable perturbations in the uniform regions are smoothed, while the step edge is restored. Note that this example exactly simulates the ringing artifacts around a strong edge. Therefore, the example demonstrates how the fuzzy filter removes these artifacts and preserves the edge as well.

Therefore, the fuzzy filter according to the invention is applied only to the pixels in edge blocks to remove ringing artifacts and preserve edges. In addition, because unnecessary smoothing in non-edge blocks is avoided, computational complexity is reduced and image details/textures are retained.

EFFECT OF THE INVENTION

The invention removes ringing artifacts in an image using a fuzzy filter. The ringing artifacts occur mostly along strong edges in the image. If the image is a decompressed image, these edges can be due to blocking used during compression.

A local variance in an input image is used to detect image edge pixels and form an edge map to guide the fuzzy filtering. Unnecessary filtering is avoided, reducing the computational complexity and preserving the original image details. Compared with the fuzzy rule-based method, the invention exploits the pixel value and local variance information in a more effective way, and with much lower complexity.

It is to be understood that various other adaptations and modifications may be made within the spirit and scope of the invention. Therefore, it is the object of the appended claims to cover all such variations and modifications as come within the true spirit and scope of the invention.

We claim:

1. A method for reducing artifacts in an input image, comprising a processor for performing step of the method, comprising the steps of:
   generating, on a pixel by pixel basis, a variance image from the input image, in which each pixel has a variance;
   partitioning the input image into a plurality of blocks of pixels;
   defining a set of classifications, the set of classifications including smooth, texture, and edge;
   assigning a particular classification to each block of pixels of the input image according to the variance image, to generate smooth blocks, texture blocks, and edge blocks; and
   applying, using the processor, a fuzzy filter only to each pixel of each edge block to preserve strong edges, while removing weak edges, in which a fuzzy transformation defines a relationship between a spatial pixel $x_i$ and an ordered pixel $x_j$ according to a membership function $\mu_F(a, b)$, where i is a spatial index i =1, 2, ..., N, j is an order statistic j =1, 2, ..., N, $X_{(1)} \leq X_{(2)} \leq ... \leq X_{(N)}$, N is a size of a N×N filtering window to which the fuzzy filter is applied, and real numbers a and b represent general variables of the membership function, and in which a particular membership function $\mu_G(a, b)$ is a Gaussian function $e^{-(a-b)^2/2\zeta^2}$, where $\zeta$ is a spread parameter, and in which $\mu_F(X_c, x_c) =1$ for all pixels, and in which an output of the fuzzy filter is $$y = \tilde{x}_c = \frac{x_c + \sum_{j=1, j \neq c}^{N} x_j \mu_G(x_c, x_j)}{1 + \sum_{j=1, j \neq c}^{N} \mu_G(x_c, x_j)},$$

where $x_c$ is a center pixal of the filtering window.

2. The method of claim 1, further comprising:
   compressing a source image using a block-based compression process to generate the input image.

3. The method of claim 1, and further comprising:
   constraining the membership function $\mu_F(a, b)$ according to:
   $\lim_{|a-b| \to 0} \mu_F(a-b)=1$;
   $\lim_{|a-b| \to \infty} \mu_F(a-b)=0$; and
   $|a_1-b_1| \leq |a_2-b_2| \Rightarrow \mu_F(a_2, b_2)$.

4. The method of claim 1, in which the spread parameter $\zeta=20$.

5. The method of claim 1, in which the fuzzy filter is applied to input pixels of the filtering window to determine weights of the input pixels.

6. The method of claim 5, in which an average of the weights determine an output of the fuzzy filter for each pixel in each edge block.

7. The method of claim 1, in which the edge blocks include at least one pixel associated with an edge in the input image.

8. The method of claim 1, in which the variance of each pixel reflects a gradient of the input at each pixel location.

9. The method of claim 8, in which the variance image is an edge map.

* * * * *